US012106733B2

(12) United States Patent
Choi et al.

(10) Patent No.: US 12,106,733 B2
(45) Date of Patent: Oct. 1, 2024

(54) REJECTING DISPLAY LEAKAGE LIGHT IN UNDER-DISPLAY SENSORS

(71) Applicant: Google LLC, Mountain View, CA (US)

(72) Inventors: Sangmoo Choi, Palo Alto, CA (US); Mark Mienko, San Jose, CA (US)

(73) Assignee: Google LLC, Mountain View, CA (US)

( * ) Notice: Subject to any disclaimer, the term of this patent is extended or adjusted under 35 U.S.C. 154(b) by 92 days.

(21) Appl. No.: 17/932,555

(22) Filed: Sep. 15, 2022

(65) Prior Publication Data

US 2023/0010162 A1 Jan. 12, 2023

Related U.S. Application Data

(60) Provisional application No. 63/375,639, filed on Sep. 14, 2022.

(51) Int. Cl.
*G09G 5/10* (2006.01)
*G09G 3/3208* (2016.01)

(52) U.S. Cl.
CPC ............ *G09G 5/10* (2013.01); *G09G 3/3208* (2013.01); *G09G 2360/144* (2013.01); *G09G 2360/145* (2013.01)

(58) Field of Classification Search
CPC ... G06F 11/162; G06F 11/1004; G09G 3/006; G09G 5/022; G09G 5/02; G09G 5/10; G09G 3/3208; G09G 2360/144; G09G 2360/145; G09G 2360/16
USPC .......................................................... 345/618
See application file for complete search history.

(56) References Cited

U.S. PATENT DOCUMENTS

| | | | |
|---|---|---|---|
| 9,697,758 | B2 | 7/2017 | Watanabe et al. |
| 10,510,317 | B2 | 12/2019 | Spence et al. |
| 11,403,984 | B2 | 8/2022 | Jung et al. |

(Continued)

FOREIGN PATENT DOCUMENTS

| | | |
|---|---|---|
| CN | 112331145 | 2/2021 |
| CN | 113053306 | 6/2021 |

(Continued)

OTHER PUBLICATIONS

"Ambient Light Sensor (ALS) Applications in Portable Electronics", Retrieved at: https://www.rohm.com/documents/11303/41217/CNA09016_wp.pdf/65cafa78-92ee-4d06-b2b6-289ddcd70eda?t=1459534857327—on Jul. 14, 2022, 9 pages.

(Continued)

*Primary Examiner* — Gordon G Liu

(74) *Attorney, Agent, or Firm* — Colby Nipper PLLC

(57) ABSTRACT

This document describes systems and directed at rejecting display leakage light in under-display sensors. In aspects, an ambient light sensor of an electronic device rejects leakage light originating from pixels in a display using a look-up table and an ambient light calculating formula. In implementations, the look-up table is developed based on a variety of operating conditions that the electronic device may experience, including variable refresh rates and display luminosities. The look-up table includes pre-calculated values of (Continued)

a leakage light ratio, for given operating conditions, that can be used to reject leakage light originating from displays by computing the ambient light calculating formula.

7 Claims, 8 Drawing Sheets

(56) References Cited

U.S. PATENT DOCUMENTS

| | | | | |
|---|---|---|---|---|
| 2009/0015166 | A1* | 1/2009 | Kwon | H04N 5/58 315/156 |
| 2014/0166850 | A1 | 6/2014 | Zheng | |
| 2015/0287352 | A1 | 10/2015 | Watanabe et al. | |
| 2016/0078838 | A1 | 3/2016 | Huang et al. | |
| 2016/0078846 | A1 | 3/2016 | Liu et al. | |
| 2016/0241819 | A1* | 8/2016 | Chien | G02B 27/0018 |
| 2017/0092196 | A1 | 3/2017 | Gupta et al. | |
| 2018/0151109 | A1 | 5/2018 | Shim et al. | |
| 2018/0301080 | A1 | 10/2018 | Shigeta et al. | |
| 2018/0336840 | A1* | 11/2018 | Niikura | C09K 19/02 |
| 2019/0191153 | A1 | 6/2019 | Speigle et al. | |
| 2020/0105226 | A1 | 4/2020 | Greenebaum | |
| 2021/0201731 | A1 | 7/2021 | Ranjan et al. | |
| 2021/0312853 | A1 | 10/2021 | Sin et al. | |
| 2021/0343257 | A1 | 11/2021 | Chen | |
| 2022/0091637 | A1 | 3/2022 | Kuon et al. | |
| 2022/0130308 | A1 | 4/2022 | Jung et al. | |
| 2022/0165814 | A1* | 5/2022 | Rieutort-Louis | H10K 59/40 |
| 2023/0088192 | A1 | 3/2023 | Qin et al. | |

FOREIGN PATENT DOCUMENTS

| | | |
|---|---|---|
| CN | 114913773 | 8/2022 |
| KR | 20160080768 | 7/2016 |
| KR | 102279278 | 7/2021 |
| WO | 2022105484 | 5/2022 |
| WO | 2022232996 | 11/2022 |

OTHER PUBLICATIONS

Choi, et al., “Disabling Transitions When Encoded Intensity is Low”, Application No. PCT/US2021/070522, filed May 10, 2021, 46 pages.

Karri, et al., “User Interface Mitigation of Display Artifacts During Transitions between Display Clock Speeds”, Technical Disclosure Commons, https://www.tdcommons.org/dpubs_series/5427, Nov. 4, 2022, 7 pages.

Shin, et al., “Dynamic Voltage Scaling of OLED Displays”, Jun. 2011, 6 pages.

Yonebayashi, et al., “High refresh rate and low power consumption AMOLED panel using top-gate n-oxide and p-LTPS TFTs”, Mar. 2020, 10 pages.

“LG Introduces New Foldable Display Tech That’s Hard as Glass, Has no Creases”, https://www.gsmarena.com/lg_introduces_new_foldable_display_material_with_no_creases_hard_as_glass-news-50837.php, Sep. 7, 2021, 1 page.

Hou, et al., “Foldable Display Stack-Up Structures with a Divided Thin Glass Layer”, Technical Disclosure Commons—https://www.tdcommons.org/dpubs_series/6406, Nov. 8, 2023, 10 pages.

Matei, Mihai, “Samsung’s Ultra-Thin Glass is no Good for Large Foldable Tablets or Laptops”, https://www.sammobile.com/news/samsung-ultra-thin-glass-no-good-for-large-foldable-tablets-laptops/, Aug. 29, 2022, 5 pages.

* cited by examiner

REJECTING DISPLAY LEAKAGE LIGHT IN UNDER-DISPLAY SENSORS

RELATED APPLICATION

This application claims priority under 35 U.S.C. § 119(e) to U.S. Provisional Patent Application 63/375,639, filed on Sep. 14, 2022 which is incorporated herein by reference in its entirety.

SUMMARY

This document describes systems and techniques directed at rejecting display leakage light in under-display sensors. In aspects, an ambient light sensor of an electronic device rejects leakage light originating from pixels in a display using a look-up table and an ambient light calculating formula. In implementations, the look-up table is developed based on a variety of operating conditions that the electronic device may experience, including variable refresh rates and display luminosities. The look-up table includes pre-calculated values of a leakage light ratio, for given device operating conditions, which can be used to reject leakage light originating from displays by computing the ambient light calculating formula.

In aspects, an electronic device is disclosed that includes: an under-display ambient light sensor configured to collect ambient light measurements; a display is disclosed that includes: a pixel array including rows of pixel circuits, each of the pixel circuits include an organic light-emitting diode (OLED) configured to illuminate; and an emission control-line driver operably coupled to each of the pixel circuits, the emission control-line driver configured to: supply a low emission-control signal and a high emission-control signal; and a processor configured to: receive ambient light measurements during the low emission-control signal and the high emission-control signal; determine, based on current operating conditions of the display and a look-up table, a value of a leakage light ratio; and calculate, based at least in part on the value of the leakage light ratio, ambient light external to a display-side of the electronic device by rejecting leakage light originating from OLEDs.

This Summary is provided to introduce simplified of concepts systems and directed at rejecting display leakage light in under-display sensors, the concepts of which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques directed at rejecting display leakage light in under-display sensors are described in this document with reference to the following drawings, in which the user of same numbers in different instances may indicate similar features or components.

DETAILED DESCRIPTION

Overview

Figure 1:
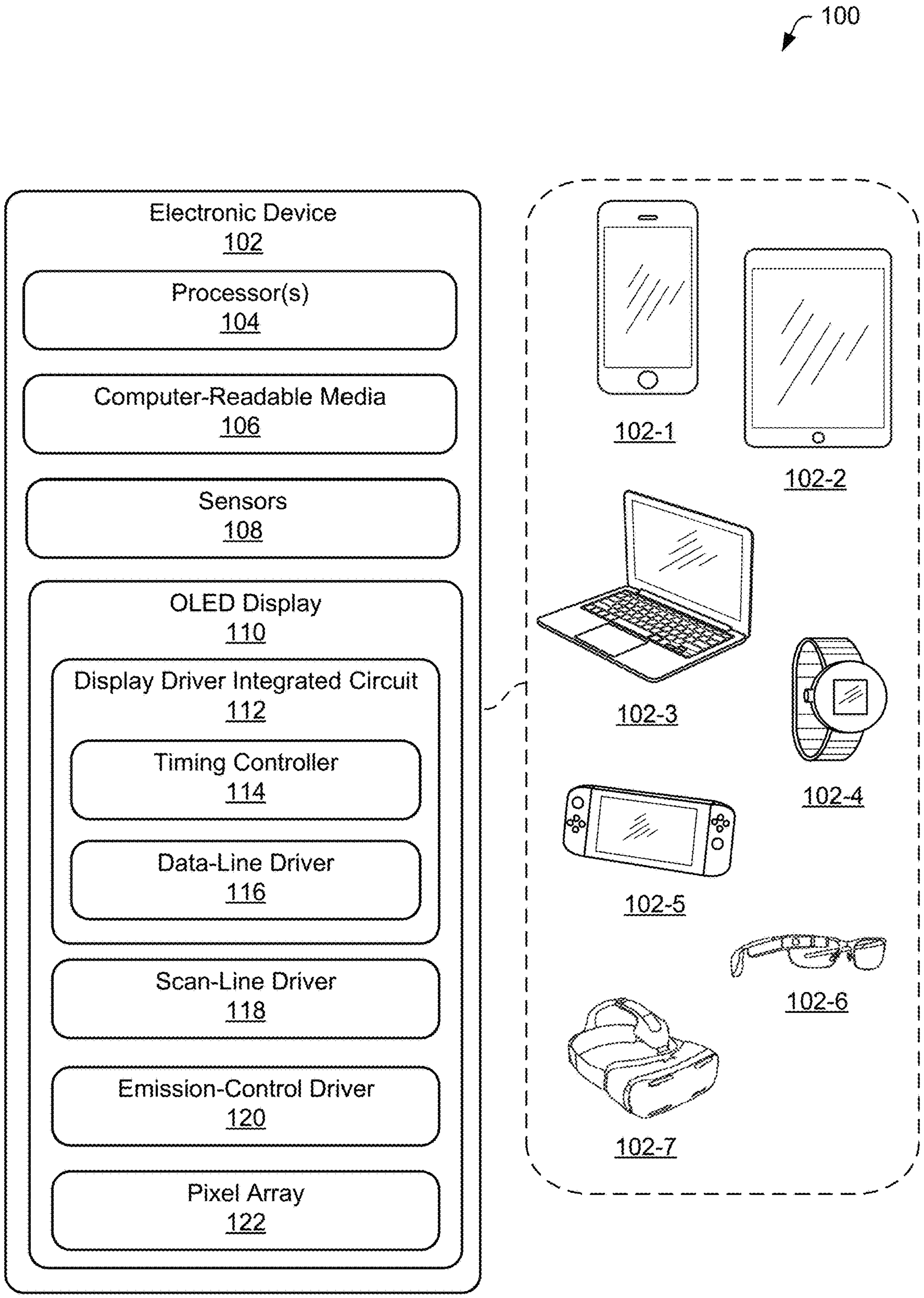
FIG. 1 illustrates an example device diagram of an electronic device in which rejection of display leakage light in under-display sensors can be implemented.

This document describes systems and techniques directed at rejecting display leakage light in under-display sensors. Many electronic devices (e.g., wireless-network devices, desktops, smartwatches) include an electronic visual display, often simply referred to as a display or screen, integrated as a portion of the electronic device's housing. Electronic device manufacturers fabricate these displays in a layered structure ("display panel stack"), containing a cover layer (e.g., cover glass) and a display module having a display panel.

These display panels include an array of pixel circuits, each having an organic light-emitting diode ("pixel"). The pixels may be composed of any colored combination of one or more subpixels, including a red subpixel, a green subpixel, and/or a blue subpixel. Electronic devices can control any of the pixels within a display panel to illuminate at various intensities and wavelengths (e.g., combined wavelengths of the sub-pixels), effective to produce on-screen content (e.g., images). By exploiting a feature of the human eye and brain referred to as persistence of vision (e.g., retinal persistence), a display panel can redraw on-screen content at predetermined frequencies ("refresh rate") to save power, change on-screen content (e.g., scrolling) seamlessly, and give an illusion of on-screen content as images in motion (e.g., video). For example, a display panel configured to operate at a 120 hertz (Hz) refresh rate can redraw on-screen content 120 times per second. The benefits of OLED displays include high refresh rates, small display response times, and low power consumption. These benefits make OLED displays well-suited for electronic devices, and are further appreciated by users, in large part, because of their display image-quality.

To preserve space on a display-side of an electronic device and, simultaneously, maximize a screen-size while maintaining an overall low profile of the electronic device, a manufacturer may embed sensors under the display (e.g., under the cover glass, under the display panel). These sensors, often referred to as under-display sensors, can include an optical under-display fingerprint sensor (UDFPS), an ambient light sensor, a camera, and the like. In one example, an ambient light sensor (e.g., a photodetector) is disposed underneath a display panel and is configured to measure an amount of light exterior to the display-side of an electronic device ("ambient light"). In operation, the electronic device may be configured to measure ambient light using the ambient light sensor during a display blanking time (e.g., an off-state of a display during a refresh operation). For instance, during a refresh operation, pixel circuits having a pixel disposed above and/or near the ambient light sensor may receive a high emission-control signal (e.g., a signal configured to cause the pixel to cease illuminating) and then, after a first interval, receive a low emission-control signal (e.g., a signal configured to cause the pixel to illuminate). During this first interval (e.g., from receipt of the high emission-control signal to receipt of the low emission control signal), the ambient light sensor may measure ambient light. Whereas, during a second interval, which spans from receipt of a low emission-control signal to receipt of a high emission-control signal, the ambient light sensor may, in an implementation, cease measuring ambient light. In an additional or alternative implementation, measurements by the ambient light sensor may be discarded by a processor during the second interval. In either implementation, these techniques can minimize noise in the ambient light measurements since light from active pixels can leak into the ambient light sensor.

However, in some circumstances, noise from pixel leakage light may still be recorded in the ambient light measurements even though a pixel circuit received a high emission-control signal (e.g., a signal configured to cause a pixel to cease illuminating). This is due to capacitance-like discharging of pixels in the pixel circuits, which causes an exponential decline in luminosity upon receipt of the high emission-control signal as opposed to an instantaneous cessation of illumination. The extent of the exponential decline may be based on material properties of components in the pixel circuits, an active display luminosity, a current refresh rate, and so forth. Therefore, despite the ambient light sensor being configured to measure light during the first interval (e.g., the period in which one or more pixels are configured to cease illuminating), ambient light measurements may still record unexpected and undesired disturbances from pixel leakage light.

To this end, this document describes systems and techniques directed at rejecting display leakage light in under-display sensors. In aspects, an ambient light sensor of an electronic device rejects leakage light originating from pixels in a display using a look-up table and an ambient light calculating formula. In implementations, the look-up table is developed (e.g., off-device) based on a variety of operating conditions that the electronic device may experience, including variable refresh rates and display luminosities. The look-up table includes pre-calculated values of a leakage light ratio, for given operating conditions, which can be used to reject leakage light originating from displays by computing the ambient light calculating formula.

The following discussion describes operating environments, techniques that may be employed in the operating environments, and example methods. Although techniques using and apparatuses for rejecting display leakage light in under-display sensors are described, it is to be understood that the subject of the appended claims is not necessarily limited to the specific features or methods described. Rather, the specific features and methods are disclosed as example implementations and reference is made to the operating environment by way of example only.

Example Environment

FIG. 1 illustrates an example device diagram 100 of an electronic device 102 in which rejection of display leakage light in under-display sensors can be implemented. The electronic device 102 may include additional components and interfaces omitted from FIG. 1 for the sake of clarity. The electronic device 102 can be a variety of consumer electronic devices. As non-limiting examples, the electronic device 102 can be a smartphone 102-1, a tablet device 102-2, a laptop computer 102-3, a computerized watch 102-4, a portable video game console 102-5, smart glasses 102-6, VR goggles 102-7, and the like.

The electronic device 102 includes one or more processors 104. The processor(s) 104 can include, as non-limiting examples, a system-on-a-chip (SoC), an application processor (AP), a central processing unit (CPU), or a graphics processing unit (GPU). The processor(s) 104 generally execute commands and processes utilized by the electronic device 102 and an operating system installed thereon. For example, the processor(s) 104 may perform operations to display graphics of the electronic device 102 on the OLED display 110 and can perform other specific computational tasks, such as controlling the creation and display of an image on the OLED display 110.

The electronic device 102 also includes computer-readable media (CRM) 106. The CRM 106 is a suitable storage device (e.g., random-access memory (RAM), static RAM (SRAM), dynamic RAM (DRAM), non-volatile RAM (NVRAM), read-only memory (ROM), flash memory) configured to store device data of the electronic device 102, user data, and multimedia data. The CRM 106 may store an operating system that generally manages hardware and software resources (e.g., the applications) of the electronic device 102 and provides common services for applications stored on the CRM 106. The operating system and the applications are generally executable by the processor(s) 104 to enable communications and user interaction with the electronic device 102.

The electronic device 102 further includes one or more sensors 108. In some examples, the sensors 108 may be disposed on or in a peripheral input device connected (e.g., wired, wirelessly) to the electronic device 102. In implementations, the sensors 108 include under-display sensors including a touch-input sensor (e.g., a touchscreen), an image-capture device (e.g., a camera, video-camera), proximity sensors (e.g., capacitive sensors), an ambient light sensor (e.g., photodetector), and/or an under-display fingerprint sensor (UDFPS).

The electronic device 102 further includes an organic light-emitting diode (OLED) display 110 having a display driver integrated circuit 112 (DDIC 112). Although an OLED display 110 is described herein, it is provided as an example only. In additional or alternative implementations, the electronic device 102 may include any of a variety of displays, including an active-matrix OLED (AMOLED) display, an electroluminescent display (ELD), a microLED display, a liquid crystal display (LCD), a thin film transistor (TFT) LCD, an in-place switching (IPS) LCD, a plasma monitor panel (PDP), and so forth.

The DDIC 112 may include a timing controller 114 and at least one data-line driver 116 (e.g., a column-line driver). The OLED display 110 may further include one or more of a scan-line driver 118 and an emission-control driver 120. In additional implementations, the OLED display 110 may include a gate-line driver and/or additional row-line drivers.

Further, the OLED display 110 may include a pixel array 122 of pixel circuits. The pixel array 122 may be controlled by the timing controller 114 via the data-line driver 116, the scan-line driver 118, and the emission-control driver 120. In other implementations, a timing controller 114 and a plurality of scan-line drivers, data-line drivers, and emission-control drivers may control the pixel circuits of a pixel array 122. As illustrated in FIG. 1, the DDIC 112 includes the data-line driver 116. In additional implementations, the data-line driver 116 may be separate from the DDIC 112 but operably coupled to the DDIC 112. In further implementations, the timing controller 114 may include the data-line driver 116.

The timing controller 114 provides interfacing functionality between the processor(s) 104 and the drivers (e.g., data-line driver 116, scan-line driver 118, emission-control driver 120) of the OLED display 110. The timing controller 114 generally accepts commands and data from the processor(s) 104, generates signals with appropriate voltage, current, timing, and demultiplexing, and transmits the signals to the data-line driver 116, the scan-line driver 118, and the emission-control driver 120 to enable the OLED display 110 to display a desired image.

The drivers may transmit time-variant and amplitude-variant signals (e.g., voltage signals, current signals) to control the pixel array 122. For example, the data-line driver 116 transmits signals containing voltage data to the pixel array 122 to control the luminance of an organic light-emitting diode. The scan-line driver 118 transmits a signal to enable or disable an organic light-emitting diode to receive the data voltage from the data-line driver 116. The emission-control driver 120 supplies an emission-control signal to the pixel array 122. Together, under the direction of the processor(s) 104, the drivers control the pixel array 122 to generate light to create an image on the OLED display 110.

Figure 2:
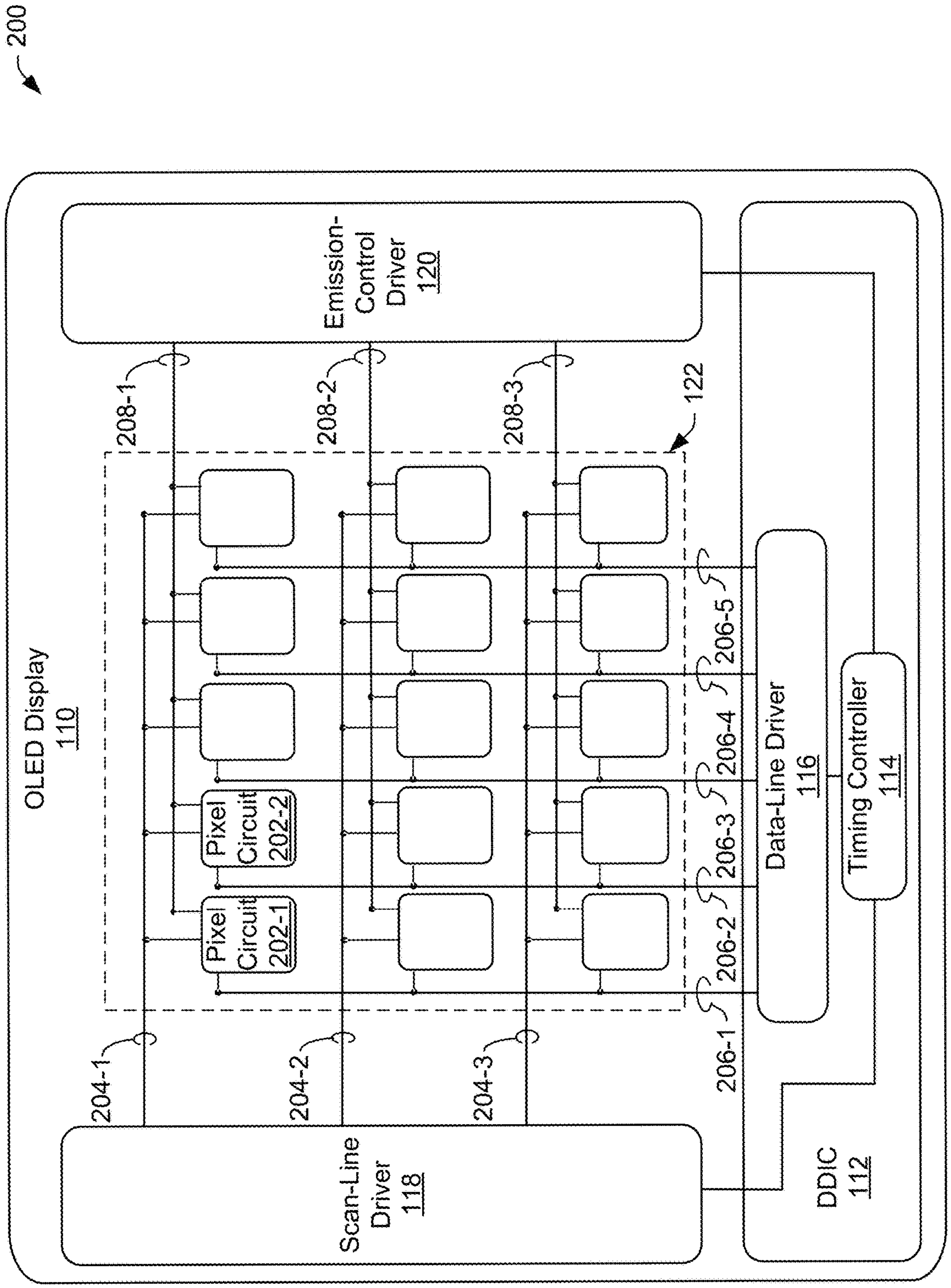
FIG. 2 illustrates an example device diagram of an example OLED display.

FIG. 2 illustrates an example device diagram 200 of an example OLED display 110. In this example, the OLED display 110 includes similar components to those described and illustrated with respect to the OLED display 110 of FIG. 1, with some additional detail.

As illustrated, the OLED display 110 includes a pixel array 122 of pixel circuits 202 (e.g., pixel circuit 202-1, pixel circuit 202-2). The OLED display 110 may contain a plurality (e.g., hundreds, thousands, millions) of pixel circuits 202, but only fifteen pixel circuits 202 are illustrated in FIG. 2 for sake of clarity. To control the pixel circuits 202, a processor (e.g., processor(s) 104) may transmit data to the DDIC 112. The timing controller 114 in the DDIC 112 may receive the signal and transmit signals with appropriate voltage, current, timing, and demultiplexing to the drivers. As a result, the drivers may transmit a series of signals via row or column lines to one or more pixel circuits 202 arranged in rows and columns. As illustrated, the scan-line driver 118 may transmit scan signals 204 (e.g., scan signal 204-1, scan signal 204-2, scan signal 204-3). The data-line driver 116 may transmit data signals 206 (e.g., data signal 206-1, data signal 206-2, data signal 206-3, data signal 206-4, data signal 206-5) via column lines. The emission-control driver 120 may transmit emission-control signals 208 (e.g., emission-control signal 208-1, emission-control signal 208-2, emission-control signal 208-3) via row lines. As an example, the emission-control driver 120 can generate and supply the emission-control signal 208-1 to pixel circuits 202 (e.g., pixel circuit 202-1, pixel circuit 202-2) operably coupled to a first row of scan lines.

Figure 3:
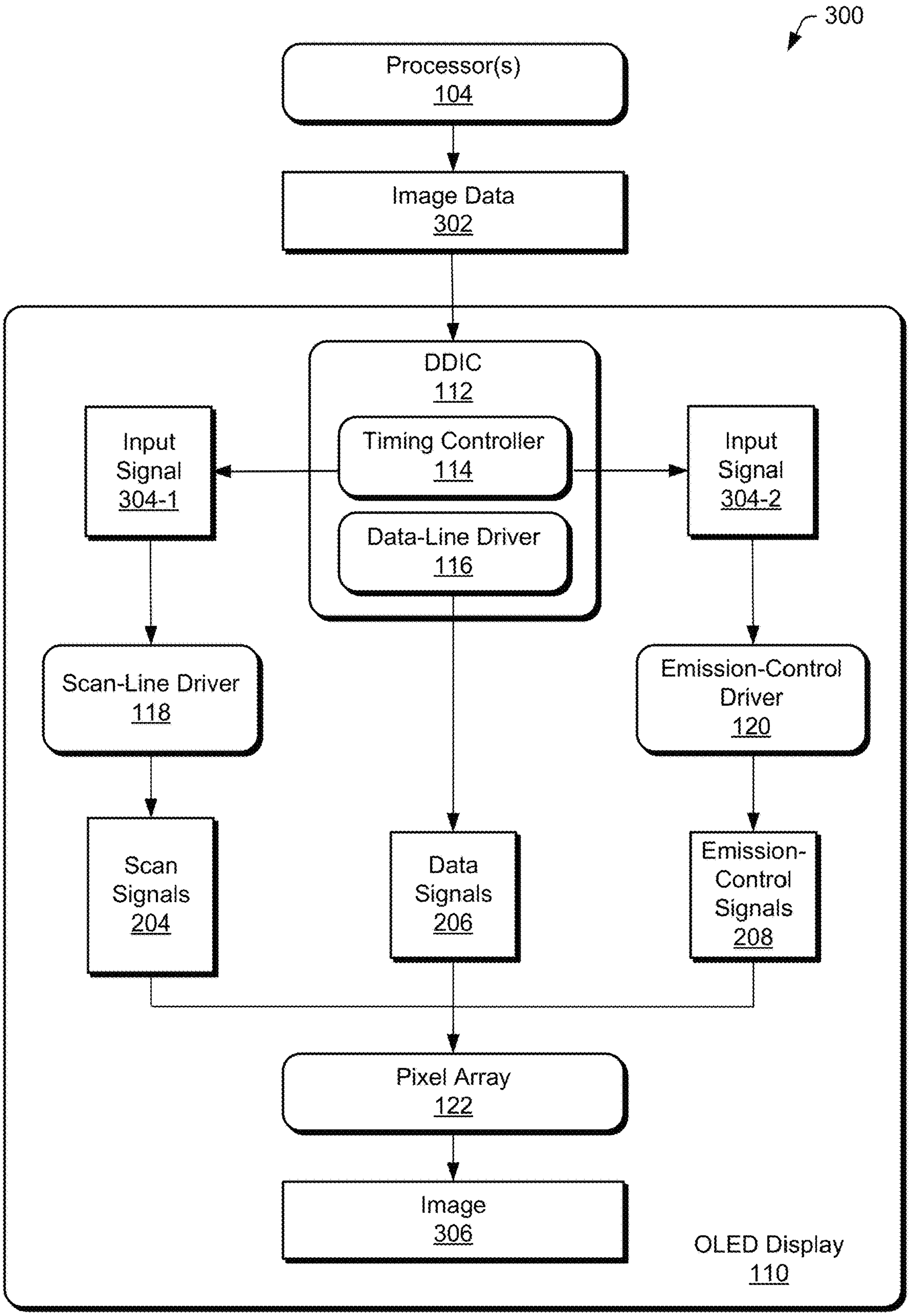
FIG. 3 is a schematic view illustrating example elements of an electronic device configured to receive, generate, and/or supply signals to produce an image on the OLED display.

FIG. 3 is a schematic view 300 illustrating example elements of an electronic device 102 configured to receive, generate, and/or supply signals to produce an image on the OLED display 110. The schematic view 300 is shown as a set of components and outputs (e.g., signals, data) thereof, but are not necessarily limited to the order or combinations shown. In portions of the following discussion, the schematic view 300 is described in the context of the OLED display 110 of FIGS. 1 and 2, or to entities or processes as detailed in other figures, reference to which is made for example only. The schematic view 300 may include outputs in a different order or with additional or fewer components and outputs thereof. Further, any of one or more of the outputs of schematic view 300 may be repeated, combined, reorganized, or linked to provide a wide array of additional and/or alternate outputs.

As described with respect to FIG. 1, the electronic device 102 includes processor(s) 104 (e.g., a GPU) to control the creation and display of an image 306 on the OLED display 110. As illustrated in FIG. 3, the processor(s) 104 transmits image data 302 to the DDIC 112 having the timing controller 114 and the data-line driver 116. The image data 302 includes information regarding the image 306. The timing controller 114 may process the image data 302 and generate input signals 304 (e.g., input signal 304-1, input signal 304-2). The timing controller 114 may supply an input signal 304-1 to the scan-line driver 118 and an input signal 304-2 to the emission-control driver 120.

The scan-line driver may generate and supply scan signals 204 to the pixel circuits 202 within the pixel array 122 through the scan lines, for example. The data-line driver 116 may generate and supply data signals 206 to the pixel circuits 202 within the pixel array 122 through the data lines, as illustrated in FIG. 2, for example. The emission-control driver 120 may generate and supply emission-control signals 208 to the pixel circuits 202 within the pixel array 122 through the emission-control lines, as illustrated in FIG. 2, for example.

Figure 4:
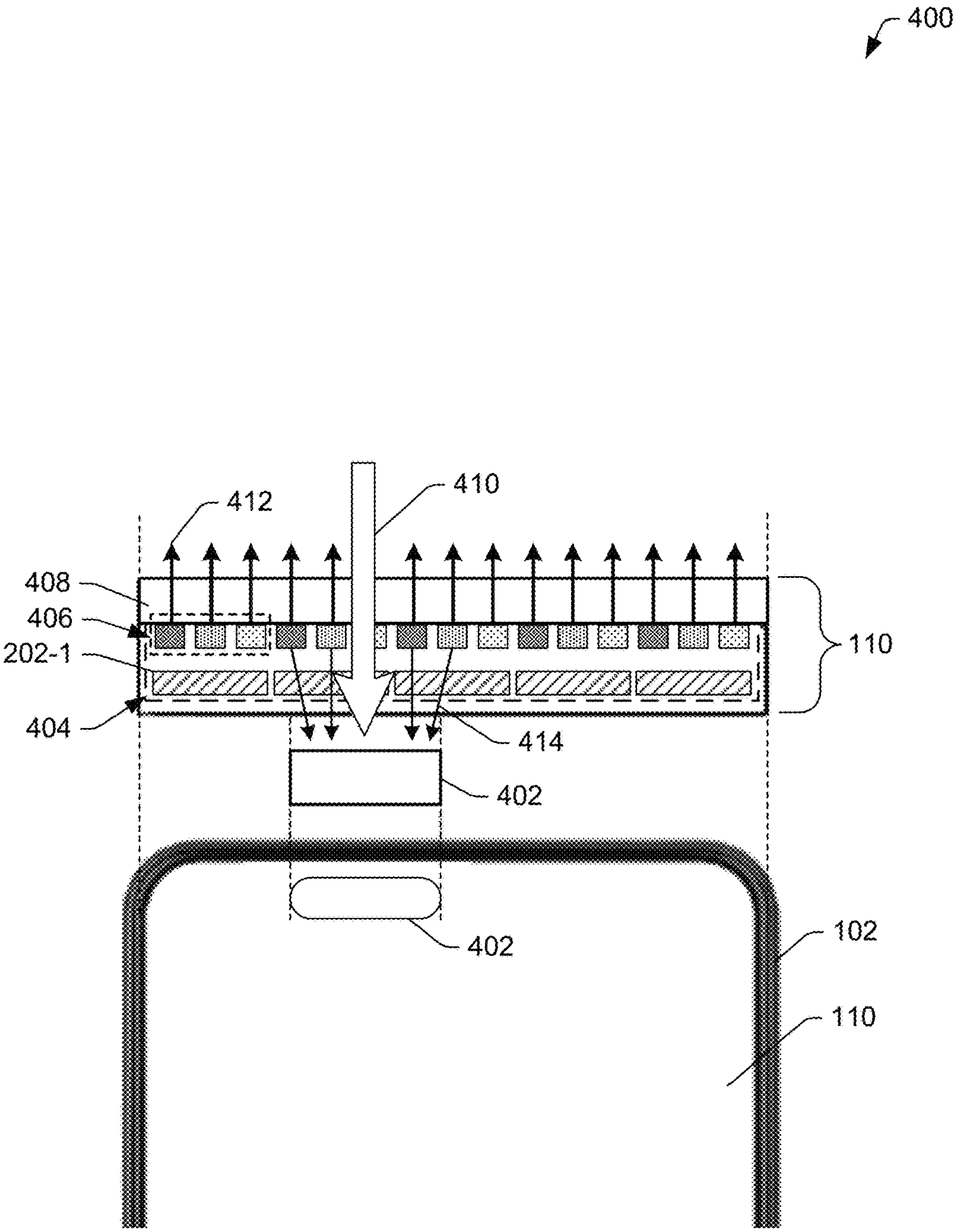
FIG. 4 illustrates a top-portion of an example electronic device having an OLED display and an example under-display sensor.

FIG. 4 illustrates a top-portion of an example electronic device 102 (e.g., smartphone 102-1) having an OLED display 110 and an example under-display sensor. In implementations, the example under-display sensor is an ambient light sensor 402. The electronic device 102 includes the pixel array 122 of pixel circuits 202, though only a portion of the pixel array ("pixel array portion" 404) is illustrated in FIG. 4. For example, the pixel array portion 404 includes five pixel circuits (not to scale), including pixel circuit 202-1. Each of the pixel circuits 202 include an OLED ("pixel"). For example, pixel circuit 202-1 includes a pixel 406 composed of a red subpixel, green subpixel, and blue subpixel. Further illustrated, the portion of the pixel array 404 may be disposed above the ambient light sensor 402 such that the pixel array 122 is positioned adjacent to a cover glass 408.

In aspects, the cover glass 408 may possess a visual light transmission (VLT) percentage sufficient to enable ambient light 410 from an external environment to transmit through the cover glass 408 to be received by the ambient light sensor 402. The cover glass 408 may include additional optical properties that may influence a diffusion, a reflectivity, and/or an absorption of light. For example, when a pixel 406 of a pixel circuit 202-1 emits light 412, portions of the emitted light 412 incident to the cover glass 408 may be scattered, reflected (e.g., internal reflection), diffused, and/or the like. When portions of the emitted light 412 are reflected ("reflected light"), the ambient light sensor 402 may detect both the ambient light 410 and the reflected light. In addition, light emitting from the pixels, such as pixel 406, may travel in a plurality of directions, and, as a result, portions of the emitted light 412 may travel towards the ambient light sensor 402 ("internal light"). The reflected light and the internal light, collectively or individually, may be referred to as leakage light 414.

Leakage light 414 originating from pixels of the OLED display 110 can negatively impact ambient light measurements collected by the ambient light sensor 402 through the introduction of signal noise. Depending on a number of factors, including a display brightness, an ambient brightness, a refresh rate, a display quality, and so on, the noise introduced in the ambient light measurements can render the measurements imprecise and/or unusable. To reduce the noise in the measurements, a timing of measurements collected by the ambient light sensor 402 may be configured to coincide with a display refresh rate. In this way, the ambient light measurements may coincide with a display blanking time (e.g., a display off-state). As an example, the ambient light sensor 402 can collect ambient light measurements that coincide with receipt of a high emission-control signal (e.g., a signal configured to deactivate pixels).

Figure 5:
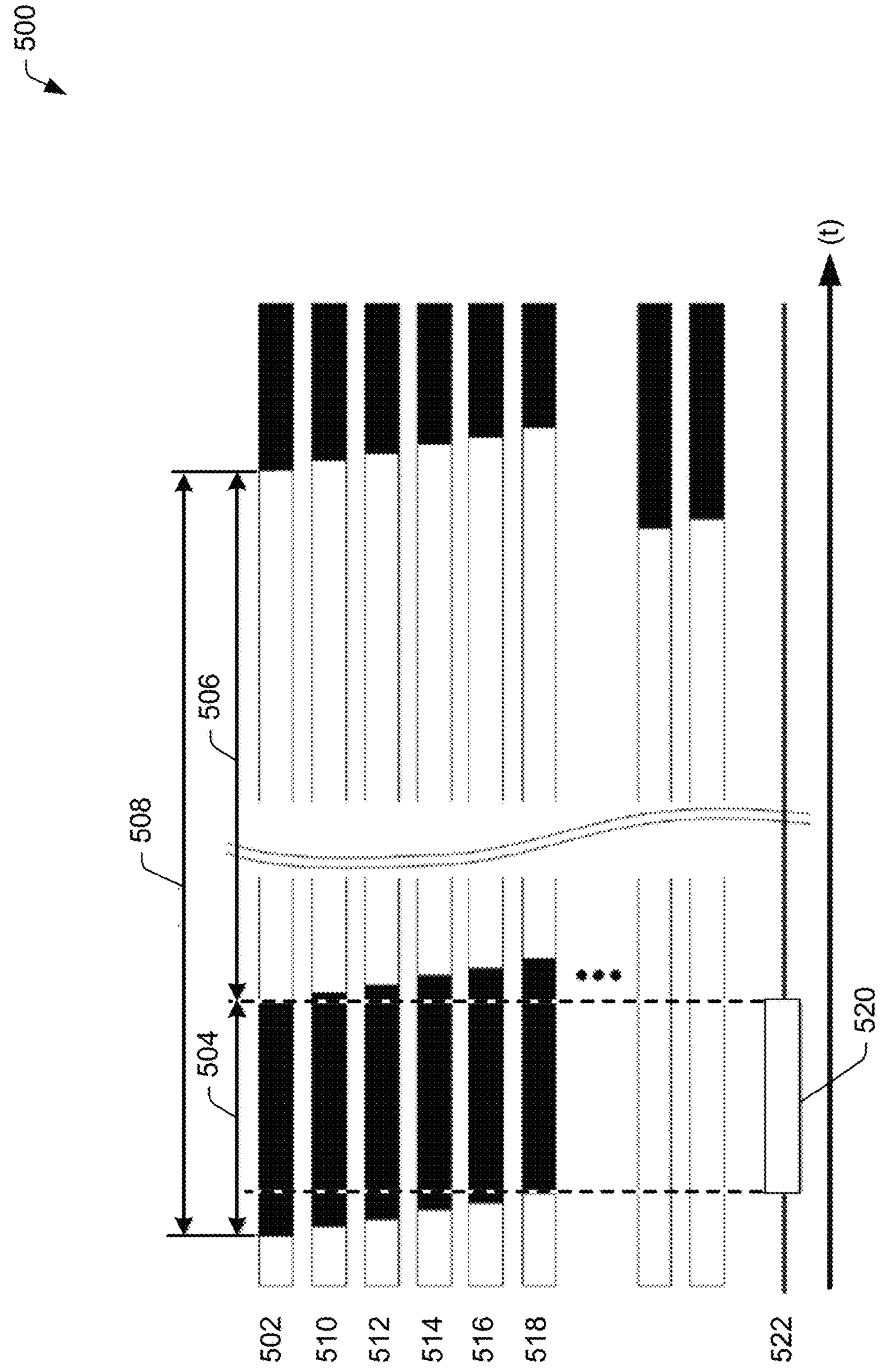
FIG. 5 graphically illustrates an example timing diagram depicting an example timing for collection of ambient light measurements and for pixel row illumination.

FIG. 5 graphically illustrates an example timing diagram 500 depicting an example timing for collection of ambient light measurements and for pixel row illumination. Each row of the timing diagram 500 represents and/or corresponds to an illumination timing for a row of pixel circuits (e.g., pixel circuits 202) in the pixel array 122. For instance, a first row 502 in the timing diagram 500 corresponds to an illumination timing for a first row of pixel circuits. As illustrated in the first row 502, pixels in the first row of pixel circuits may be configured to cease illumination ("pixel off-time" 504) upon receipt of, for example, a high emission-control signal. Then, upon receipt of, for example, a low-emission-control signal, the first row of pixel circuits may be configured to illuminate ("pixel on-time" 506). A single frame time 508 for the first row 502 may include the pixel off-time 504 and the pixel on-time 506. As described in more detail with respect to FIG. 6, the pixel off-time 504 should not be construed as being representative of zero illumination; instead, the pixel off-time 504 should be understood as being representative of any luminosity less than the luminosity of the pixel on-time 506 within the same frame time 508.

Depending on dimensions of an ambient light sensor (e.g., ambient light sensor 402) and/or the magnitude of the internal light and reflected light, the collection of ambient light measurements may coincide with more than the pixel off-time 504 for the first row of pixels. For example, the collection of ambient light measurements may coincide with a pixel off-time for a second row of pixel circuits corresponding to a second row 510 in the timing diagram 500, a third row of pixel circuits corresponding to a third row 512 in the timing diagram 500, a fourth row of pixel circuits corresponding to a fourth row 514 in the timing diagram 500, a fifth row of pixel circuits corresponding to a fifth row 516 in the timing diagram 500, and a sixth row of pixel circuits corresponding to a fifth row 518 in the timing diagram 500. In this way, when some or all rows of pixels disposed near or above the ambient light sensor are configured to cease illumination, the ambient light sensor may be configured to collect ambient light measurements 522, corresponding to a last row 522 in the timing diagram 500. Despite the collection of ambient light measurements coinciding with a blanking timing for rows of pixels in the pixel array 122, the ambient light sensor may still measure noise from leakage light 414.

Figure 6:
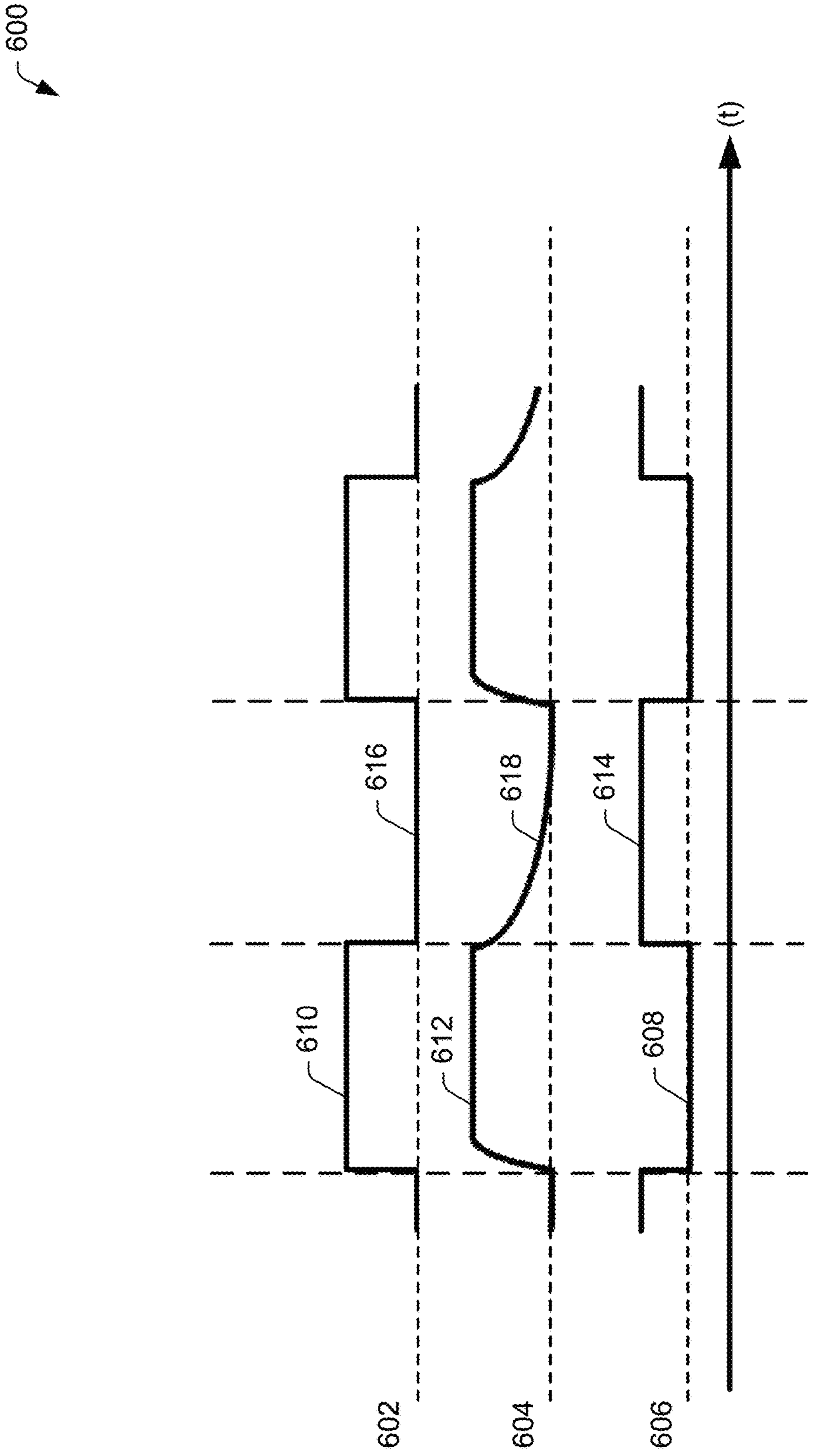
FIG. 6 graphically illustrates an example timing diagram of an ideal pixel illumination, an example realistic pixel illumination, and an emission-control signal.

FIG. 6 graphically illustrates an example timing diagram 600 of an ideal pixel illumination 602, an example realistic pixel illumination 604, and an emission-control signal 606. As illustrated, when a pixel circuit (e.g., pixel circuit 202-1) receives a low emission-control signal 608, the ideal pixel illumination 610 response is instantaneous illumination to the maximum luminosity determined by, for example, a data signal. Realistically, however, the pixel illumination 612 response is exponential (e.g., similar to charging a capacitor).

Further illustrated, when a pixel circuit receives a high emission-control signal 614, the ideal pixel illumination 616 response is instantaneous cessation of illumination. Realistically, however, the cessation of pixel illumination 618 is exponential (e.g., similar to discharging a capacitor). For instance, when the pixel circuit receives a high emission-control signal 614, the pixel exponentially decreases in luminosity. As a result, even though the timing for collection of ambient light measurements may coincide with a display blanking time (e.g., a high emission-control signal) for one or more rows of pixel circuits, the ambient light sensor may still collect leakage light (e.g., residual leakage light) originating from the OLED display 110 resulting in signal noise in the ambient light measurements.

In aspects, an ambient light sensor of an electronic device (e.g., electronic device 102) may be configured to reject leakage light originating from pixels in an OLED display 110 using a look-up table and an ambient light calculating formula. In implementations, the look-up table may be developed (e.g., off-device) based on a variety of operating conditions that the electronic device may experience. The various conditions may include any combination of the OLED display 110 operating (i) within a range of maximum brightness to minimum brightness and/or (ii) within a range of quickest refresh rate to slowest refresh rate. The look-up table may include pre-calculated values of a leakage light ratio that can be used to reject leakage light by computing the ambient light calculating formula.

Figure 7:
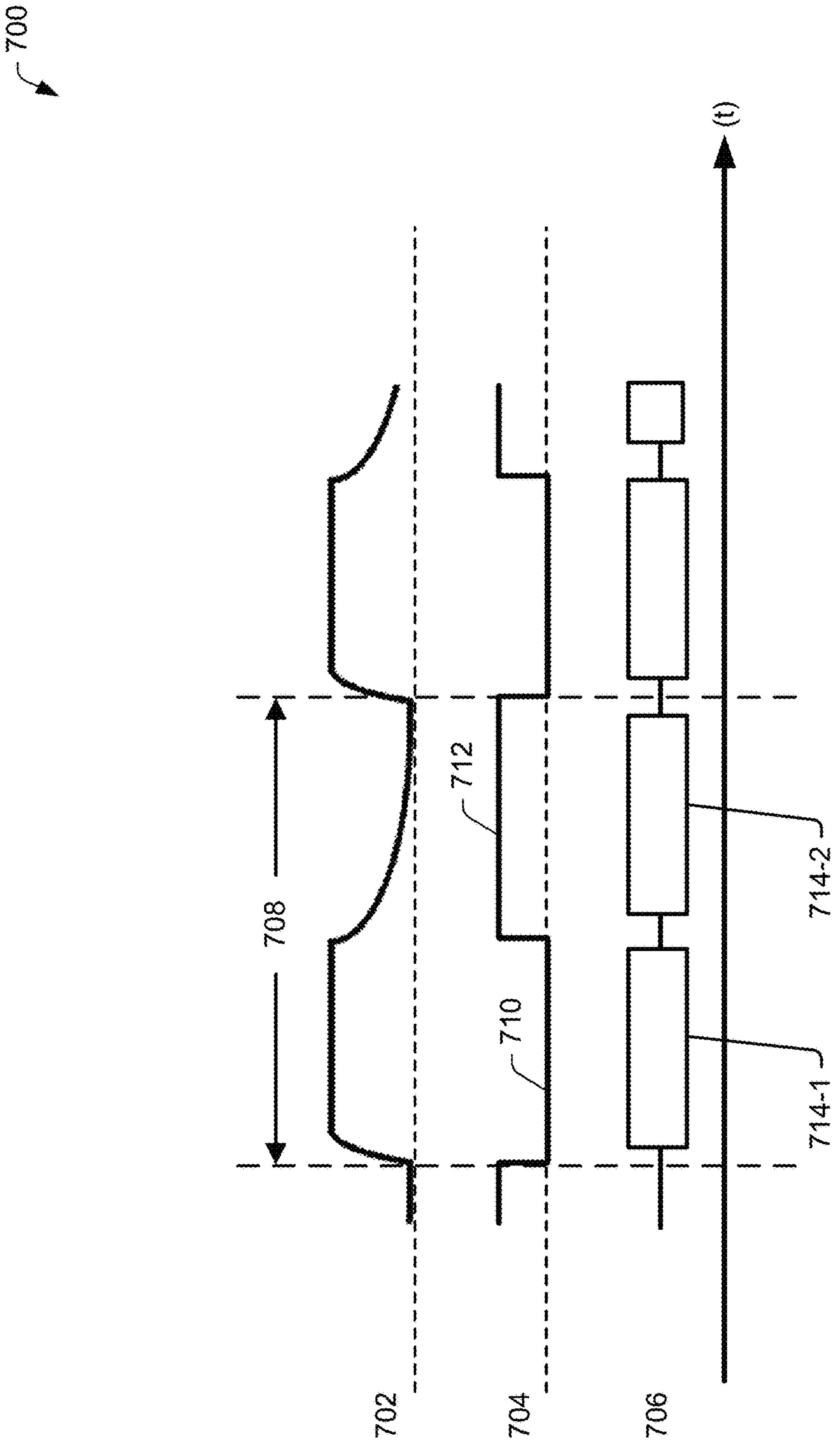
FIG. 7 graphically illustrates an example timing diagram for development of the look-up table.

FIG. 7 graphically illustrates an example timing diagram 700 for development of the look-up table. The timing diagram 700 includes an example realistic pixel illumination 702, an emission-control signal 704, and a timing for collection of ambient light measurements 706. As illustrated, the timing diagram 700 depicts an example display frame time 708 having a low emission-control signal 710 and a high emission-control signal 712. Although the low emission-control signal 710 and the high emission-control signal 712 are illustrated as extending for an identical duration, in additional implementations, the signals may vary in duration.

In aspects, an electronic device (e.g., a preproduction model of electronic device 102) may be placed in an environment with no ambient light (e.g., a "dark room"). An ambient light sensor of the electronic device may then collect ambient light measurements while the electronic device presents on-screen content (e.g., a white screen, a blue image) in the dark room. For purposes of the following discussion, ambient light measurements collected during development of the look-up table are referred to as development measurements.

In implementations, the collection of development measurements by the ambient light sensor can coincide with the low emission-control signal 710 and the high emission-control signal 712. For instance, a first collection 714-1 of development measurements can coincide with the low emission-control signal 710 and a second collection 714-2 of development measurements can coincide with the high emission-control signal 712. The leakage light ratio may then be calculated using the following formula:

$$a=L_{X\_OFF}/L_{X\_ON},$$

where $L_{X\_OFF}$ corresponds to development measurements collected during the second collection 714-2 and $L_{X\_ON}$ corresponds to development measurements collected during the first collection 714-1. Using any combination of refresh rates, varying on-screen content, and display luminosities (e.g., brightness), the look-up table can be developed for each calculated value of the leakage light ratio. The calculated values of the leakage light ratio may be less than or equal to one. If, however, a calculated value of the leakage light ratio is greater than 1, then the calculated value may be replaced with zero (e.g., or a null value).

Once developed, the look-up table may be wirelessly distributed (e.g., deployed) to electronic devices. In additional or alternative implementations, an electronic device can develop a look-up table itself, or the electronic device can add information to the distributed look-up table. In operation, an electronic device (e.g., electronic device 102) can collect ambient light measurements during a low emission-control signal (e.g., low emission-control signal 608) and a high emission-control signal (e.g., high emission-control signal 614). Concurrently, or sequentially, the electronic device can determine, based on current operating conditions, a value of the leakage light ratio using the distributed look-up table. The electronic device can then calculate ambient light by rejecting display leakage light using the following formula:

$$L_y = a * L_{ON}/(a-1) - L_{OFF}/(a-1),$$

where $L_y$ corresponds to the calculated ambient light, $L_{ON}$ corresponds to ambient light measurements collected while one or more pixel circuits of the OLED display 110 receive a low emission-control signal (e.g., a non-blanking time of a display), and $L_{OFF}$ corresponds to ambient light measurements collected while one or more pixel circuits of the OLED display 110 receive a high emission-control signal (e.g., a blanking time of a display).

In additional implementations, an algorithm (e.g., a machine-learned model) may be configured to develop the look-up table based on a variety of operating conditions that an electronic device may experience and/or be exposed to. In still further implementations, algorithms may be deployed to electronic devices which are configured to (e.g., trained to) compute the ambient light calculating formula, or an additional formula developed through training, to determine ambient light by rejecting display leakage light. The algorithms may utilize the look-up table and/or an additional data storage and extraction mechanism.

Figure 8:
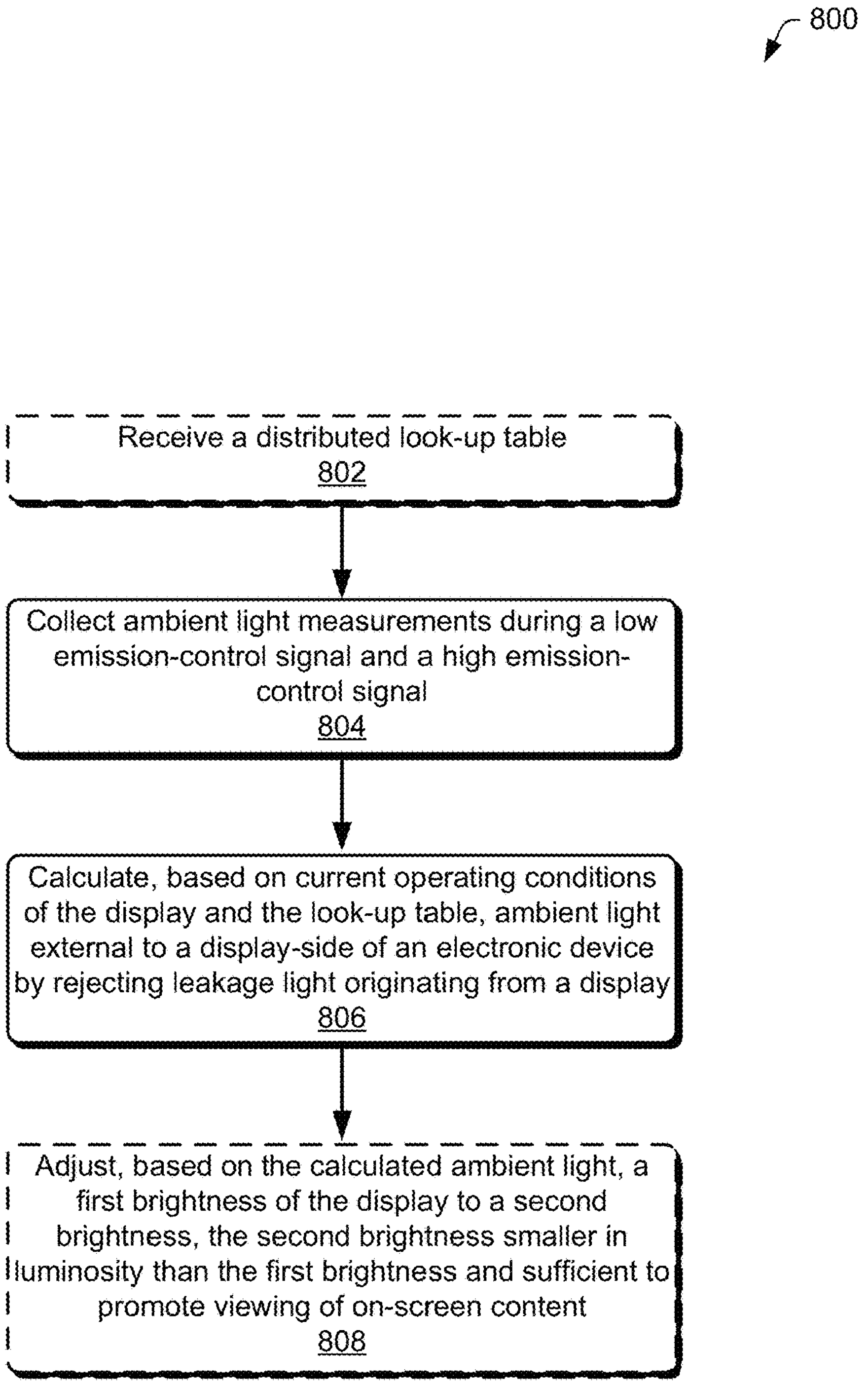
FIG. 8 illustrates a method for rejecting display leakage light in under-display sensors.

FIG. 8 illustrates a method 800 for rejecting leakage light originating from displays (e.g., OLED display 110) in under-display sensors. At optional step 802, the electronic device receives a distributed look-up table. In additional or alternative implementations, the look-up table may be developed on the electronic device during, for example, system initialization.

At step 804, an ambient light sensor, such as an under-display ambient light sensor, of the electronic device collects ambient light measurements during a low emission-control signal and a high emission-control signal. In one example, a processor of the electronic device receives ambient light measurements from an ambient light sensor. In an additional example, the low emission-control signal may correspond to a non-blanking time of the display, while the high emission-control signal may correspond to a blanking time of the display.

At step 806, the electronic device calculates (e.g., using a processor, an SoC, and/or a processor integrated in an ambient light sensor module), based on current operating conditions of the display and the look-up table, ambient light external to a display-side of the electronic device by rejecting leakage light originating from organic light-emitting diodes (OLEDs), also referred to as pixels. Calculation of the ambient light may be useful to more-precisely determine ambient light conditions, which may in turn lead to, for example, better image-capturing, more appropriate screen brightness adjustment, and so forth.

In some implementations, calculating ambient light may further involve the electronic device determining (e.g., using a processor), based on operating conditions of a display and the look-up table, a leakage light ratio. The look-up table may include values of the leakage light ratio calculated under various conditions, including varying display luminosities, display refresh rates, and/or differing on-screen content. The look-up table may be stored on-device in computer-readable media. The leakage light ratio be unitless. The leakage light ratio may also be usable for above-standard, standard, or below-standard displays.

At optional step 808, the electronic device may adjust, based on the calculated ambient light, a first brightness of the display to a second brightness, the second brightness smaller in luminosity than the first brightness and sufficient to promote viewing of on-screen content. For example, the first brightness of the display may be too bright due to an inclusion of leakage light in ambient light measurements. The second brightness, however, may be appropriately bright to promote viewing of on-screen content, enhance user experience, and/or save power.

What is claimed is:

1. An electronic device comprising:

an under-display ambient light sensor configured to collect ambient light measurements;

a display comprising:

a pixel array including one or more pixel circuits, each pixel circuit of the one or more pixel circuits comprising a diode configured to illuminate; and an emission control-line driver operably coupled to the pixel array, the emission control-line driver configured to:

supply, based on intended display operating conditions, a low emission-control signal and a high emission-control signal effective to cause at least portions pf the pixel array to illuminate and darken, respectively; and a processor configured to:

receive ambient light measurements during the low emission-control signal and the high emission-control signal; and calculate, based on display operating conditions and a look-up table, ambient light external to a display-side of the electronic device by rejecting leakage light originating from the pixel array, the processor configured to calculate ambient light using an ambient light formula:

$$L_Y = \alpha * L_{ON}/\alpha - 1 -- L_{OFF}/(\alpha - 1),$$

where '$L_Y$' corresponds to the calculated ambient light, 'a' corresponds to the leakage light ratio, '$L_{ON}$' corresponds to ambient light measurements during the low emission-control signal, and '$L_{OFF}$' corresponds to ambient light measurements during the high emission-control signal.

2. The electronic device of claim 1, wherein the look-up table comprises pre-calculated leakage light ratios for a variety of display operating conditions.

3. The electronic device of claim 2, wherein the leakage light ratio is calculated during development of the look-up table on a second electronic device, the leakage light ratio based on a formula:

$$a = L_{X\_OFF}/L_{X\_ON},$$

where 'a' corresponds to the leakage light ratio, '$L_{X\_OFF}$' corresponds to ambient light measurements collected during a high emission-control signal on the second electronic device, and '$L_{X\_ON}$' corresponds to ambient light measurements collected during a low emission-control signal on the second electronic device.

4. The electronic device of claim 3, wherein the processor is further configured to receive, prior to the receipt of ambient light measurements, the look-up table developed on the second electronic device.

5. The electronic device of claim 1, wherein the processor is further configured to adjust, based on the calculated ambient light, a first brightness of the display to a second brightness, the second brightness smaller in luminosity than the first brightness and sufficient to promote viewing of on-screen content.

6. The electronic device of claim 1, wherein the current operating conditions of the display include at least one of a display refresh rate or a display brightness.

7. The electronic device of claim 1, wherein the processor is packaged with the under-display ambient light sensor.

* * * * *